US008650946B1

(12) United States Patent
Feller

(10) Patent No.: US 8,650,946 B1
(45) Date of Patent: Feb. 18, 2014

(54) THERMAL FLOW SENSOR HAVING AN ELECTROMAGNETIC ACTUATOR FOR A CYCLIC FLOW MODULATOR

(71) Applicant: Murray F Feller, Micanopy, FL (US)

(72) Inventor: Murray F Feller, Micanopy, FL (US)

(73) Assignee: Onicon Inc., Clearwater, FL (US)

( * ) Notice: Subject to any disclaimer, the term of this patent is extended or adjusted under 35 U.S.C. 154(b) by 0 days.

(21) Appl. No.: 13/781,916

(22) Filed: Mar. 1, 2013

(51) Int. Cl.
*G01F 1/68* (2006.01)
(52) U.S. Cl.
USPC ............... 73/204.23; 73/204.21; 73/202.5
(58) Field of Classification Search
None
See application file for complete search history.

(56) References Cited

U.S. PATENT DOCUMENTS

| 4,565,098 | A | 1/1986 | Herzl |
| 5,390,541 | A | 2/1995 | Feller |
| 5,948,978 | A | 9/1999 | Feller |
| 6,023,969 | A | 2/2000 | Feller |
| 8,069,734 | B2 | 12/2011 | Oda et al. |

*Primary Examiner* — Harshad R Patel
(74) *Attorney, Agent, or Firm* — David Kiewit

(57) ABSTRACT

A thermal flow sensor is responsive only to a modulated component of the flow. At zero flow the modulated component disappears, except for an artifact caused by motion of the modulator. This artifact is minimized by reducing the extent of modulator motion and by sampling the modulated signal at a quiescent part of the modulator's operating cycle. This results in a thermal flow sensor with a very stable zero.

4 Claims, 4 Drawing Sheets

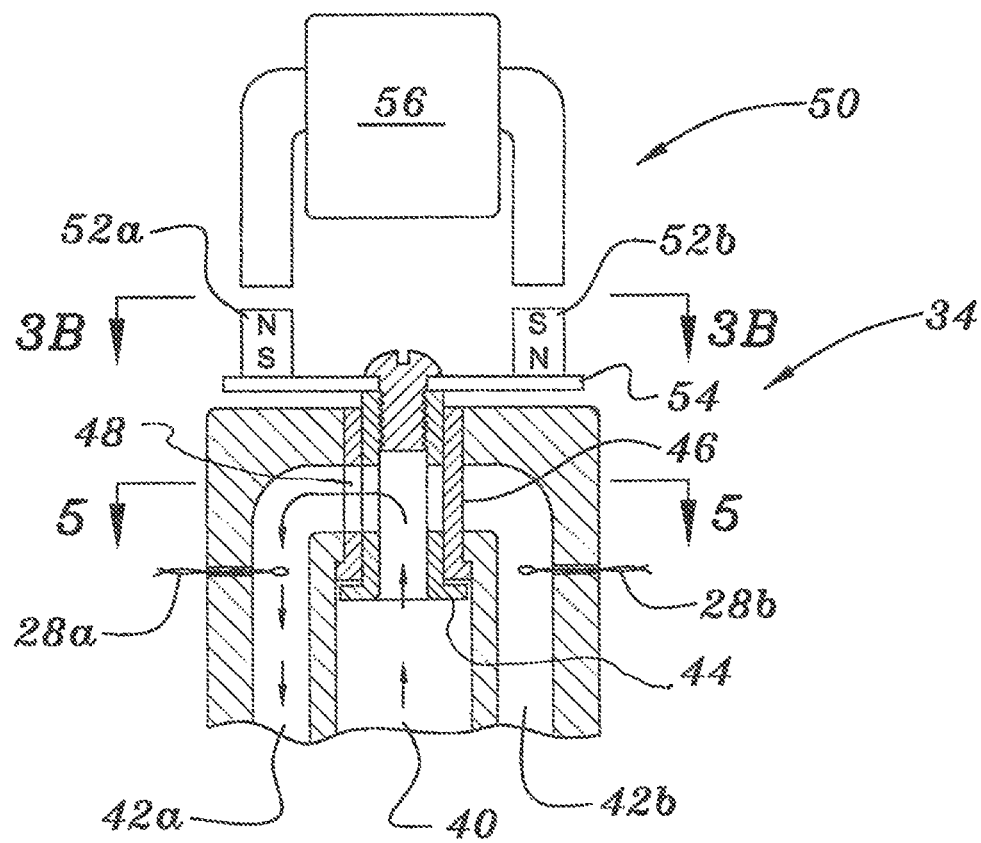
FIG. 3A
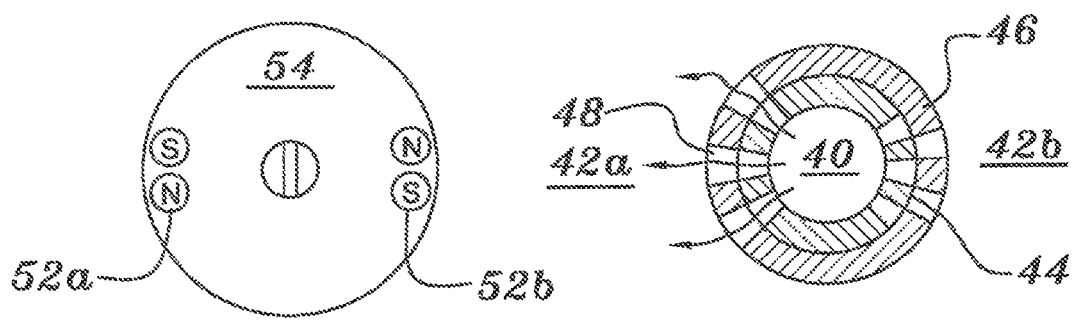
FIG. 3B
FIG. 5

THERMAL FLOW SENSOR HAVING AN ELECTROMAGNETIC ACTUATOR FOR A CYCLIC FLOW MODULATOR

BACKGROUND OF THE INVENTION

Background Information

Fluid flow rates are often measured using sensors that introduce flow impedance. For example, differential pressure flowmeters, vortex meters, turbine meters, moving target meters and various other sorts of flow meters configured as probes all restrict flow and thereby provide a flow impedance that is an inherent feature of the sensor itself.

In a case of particular interest, a differential pressure sensor senses a pressure difference caused by a flow obstruction, where the differential pressure is an indication of the fluid flow rate. The differential pressure sensor's output is a highly non-linear function of flow rate and is usable over a limited operating range. Differential pressure sensors are particularly inaccurate at very low flow rates. Thus, there is a need to enhance the linearity and accuracy of this type of sensor at lower portions of the flow range.

A thermal flow sensor taught by the inventor in his U.S. Pat. No. 6,023,969 is responsive to only a cyclic component of a modulated flow. Because the cyclic component, aside from a possible offset introduced by fluid motion induced by the flow modulator itself, is zero when there is no flow, this sensor provides an accurate and stable zero. This sensor shares a common drawback of thermal flow sensors in that the presence of a contaminant film on a heated sensing element reduces accuracy at higher flow rates.

BRIEF SUMMARY OF THE INVENTION

One aspect of the invention is that it provides a composite apparatus for measuring a rate of flow of a fluid in a primary conduit in the neighborhood of a flow impedance. This apparatus comprises a first flow sensor that may include the flow impedance as an implicit feature of its installation in the primary conduit (e.g., the first flow meter may be a vortex or turbine meter). Alternately, an orifice plate or other flow restriction may be added to the primary conduit and the pressure drop across that restriction may be measured by a flow sensor that does not, of itself, add an appreciable flow impedance and (e.g., a differential pressure sensor) and that may require the addition of a separate element (e.g., an orifice plate) to provide the flow impedance. The first flow sensor is operable to provide a first measure of the rate of flow in the primary conduit. The apparatus also comprises a bypass conduit extending from a point upstream of the flow impedance to another point downstream of the flow impedance so that a pressure drop in the primary conduit causes fluid to flow through the bypass conduit. In addition there is a thermal flow sensor installed in the bypass conduit. The thermal flow sensor comprises at least one heated temperature sensitive element and a flow modulator operable to modulate flow in the bypass conduit to thereby cause the at least one temperature sensitive element to generate a cyclic signal indicative of heat removed by the flowing fluid. The cyclic signal is processed by signal processing circuitry that generates from it a second measure of the rate of flow in the primary conduit.

Another aspect of the invention is that it combines a first flow measurement made by a flow sensor accurate at medium to high flow rates with a thermal flow measurement having a stable zero. This can provide an increased range of flows over which an accurate measurement can be made. In this combination a preferred thermal flow sensor is generally of the type described by the inventor in his U.S. Pat. No. 6,023,969, the teaching of which is herein incorporated by reference.

A specific aspect of the invention is that it provides an apparatus for measuring the rate of flow of a fluid in a primary conduit by combining at least: a flow restriction; a differential pressure sensor; and a thermal flow sensor disposed in a bypass conduit extending between the two sensing surfaces of the differential pressure sensor. In this arrangement the differential pressure sensor provides a first measure of the rate of flow of fluid in the primary conduit from the pressure change associated with the restriction. The thermal flow sensor, which is characterized by very low zero drifts, comprises a flow modulator operable to modulate flow in the bypass conduit so as to cause at least one heated temperature sensitive element in the thermal sensor to generate a cyclic signal indicative of the amount of heat removed from it by the fluid flowing in the bypass conduit. This measurement can be extrapolated to provide a second measure of the rate of flow of fluid in the primary conduit.

In a particular preferred embodiment, the invention provides an apparatus for measuring a rate of flow of a fluid in a primary conduit. This apparatus comprises: a flow restriction in the primary conduit; a differential pressure sensor arranged to sense a pressure differential caused by the flow restriction and to provide therefrom a first measure of the rate of flow in the primary conduit; a bypass conduit extending between the two sensing surfaces of the differential pressure sensor; and a thermal flow sensor for providing a second measure of the rate of flow. This thermal flow sensor comprises two heated temperature sensitive elements disposed in portions of the bypass conduit and exposed to a modulated flow which causes the two temperature sensitive elements to generate respective cyclic signals that are one hundred eighty degrees out of phase and which indicate the respective amounts of heat removed by the flowing fluid. The thermal flow sensor also comprises thermal flow signal processing circuitry operable to receive the cyclic signals and to generate from them a second measure of the rate of flow. In addition, the preferred apparatus comprises decision making circuitry having inputs from both the differential pressure sensor and from the signal processing circuitry. The decision making circuitry may be operable to construct a composite measurement of the rate of flow from the first and second measures thereof, or to select that one of the two measures that is known to be the more accurate indicator of the measured flow rate. Moreover one of the meters can be used to calibrate the other.

It is yet a further aspect of the invention to combine a first flow measurement made in a primary conduit with a thermal flow measurement made in a bypass conduit that has an orifice, valve or other restriction in it. The flow restriction is preferably chosen to be small enough that little fluid flows through the bypass channel and the readings from the first flow sensor are nearly unaffected by the secondary flow. The restriction cuts the fluid flow increasingly as the flow rate increases and responds to increasing flow rates in a manner complementary to the response of the first flow sensor so that the two measurements can be combined to provide a response that is both more linear and that extends over a greater operating range. Note that the flow restriction in the bypass conduit can be located at a wide variety of locations within that conduit.

A still further object of the invention is to provide a thermal flow sensor comprising thermal signal processing circuitry and a more efficient and economical cyclic flow modulator. The cyclic flow modulator may comprise a bifurcated flow channel; an electromechanical actuator; a movable perforate member; and two heated temperature sensitive elements. The perforate member is preferably movable by the electromechanical actuator to provide a maximum flow rate to a first portion of the bifurcated flow channel at the same time that it provides a minimum flow rate to the second portion of the bifurcated flow channel. The two heated temperature sensitive elements may be separately disposed to receive fluid flowing through the first and second bifurcated portions of the flow channel so as to generate respective cyclic signals indicative of respective amounts of heat removed therefrom by a flowing fluid.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 3A is a partly schematic, partly sectional view of a preferred flow modulator from which some of the seals and supporting structure have been removed in the interest of clarity of presentation. FIG. 3B is a schematic top view of a portion of the preferred modulator of FIG. 3A, the view taken as indicated by the double-headed arrow 3B-3B in FIG. 3A.

FIG. 5 is a cross-sectional view, taken as shown by the double-headed arrow 5-5 in FIG. 3A.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1A:
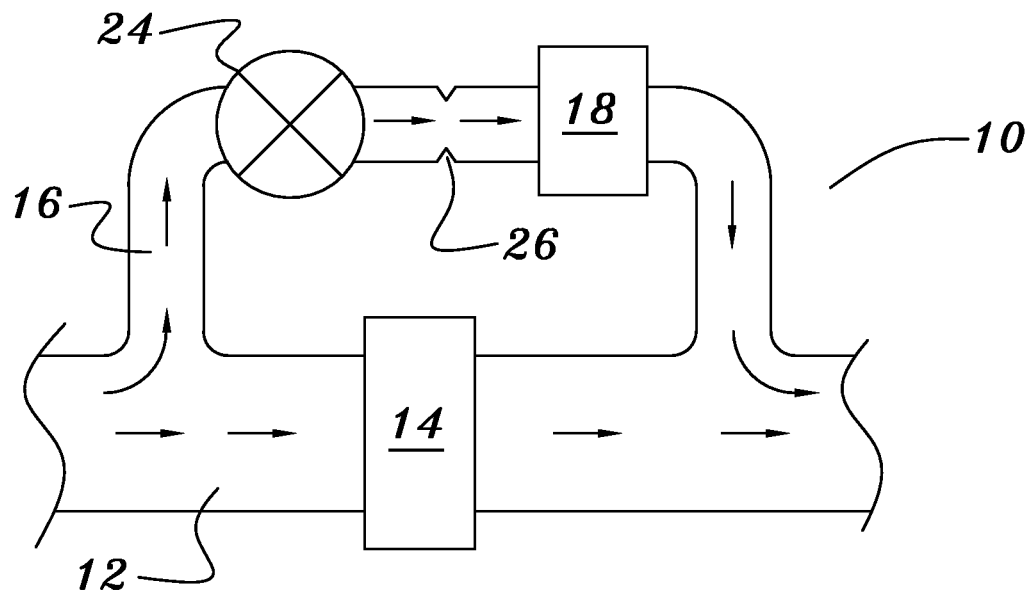
FIG. 1A is a schematic depiction of a preferred flow measurement apparatus of the invention wherein a first flow sensor, which causes a flow restriction in a primary flow conduit, provides a first measure of flow and wherein a thermal flow sensor disposed in a bypass conduit provides a second measure of flow.

Turning now to FIG. 1A one finds a schematic depiction of exemplar measurement apparatus of the invention 10 for measuring flow through a pipe or other primary conduit 12. A flow impedance introduced by and inherent in the installation of a first flow sensor 14 provides a pressure drop adequate to cause a small fraction of the flowing fluid to flow through a bypass conduit 16 connected to the primary conduit 12 at selected locations respectively upstream and downstream of the first flow sensor 14. In addition, there is a thermal flow sensor 18 disposed in the bypass conduit 16.

Figure 1B:
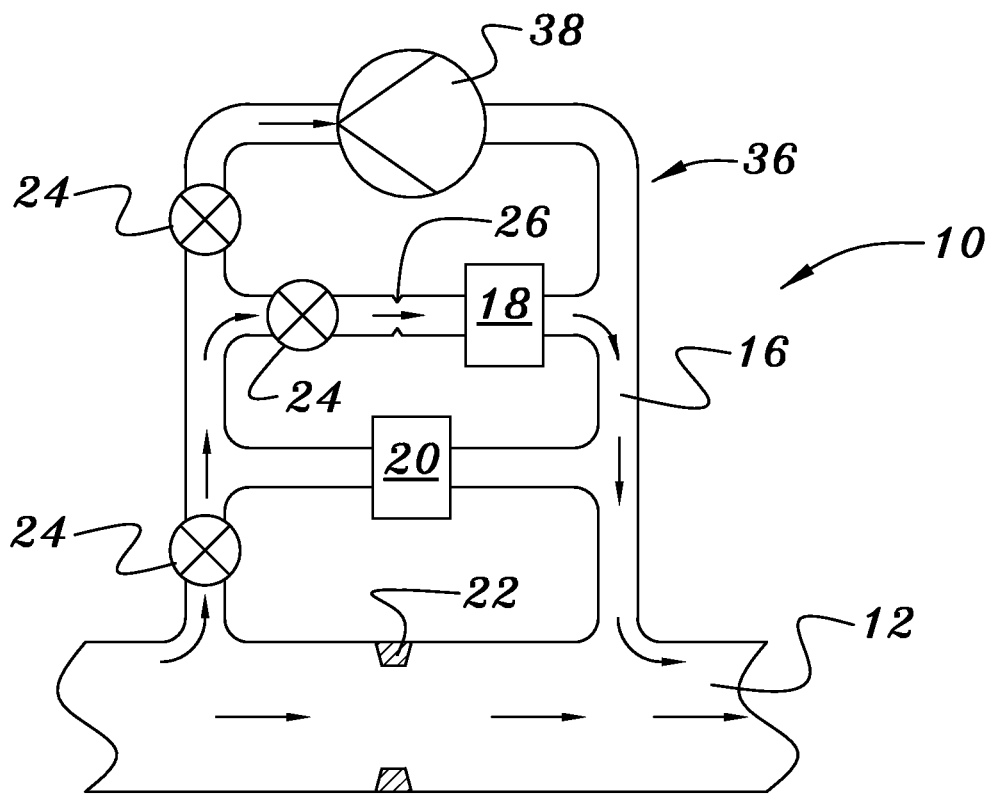
FIG. 1B is a schematic depiction of preferred flow measurement apparatus of the invention wherein a differential pressure sensor, connected across a separate flow restriction in a primary flow conduit, provides a first measure of flow and a thermal flow sensor installed in a bifurcated bypass conduit provides a second measure of the flow.
Figure 2:
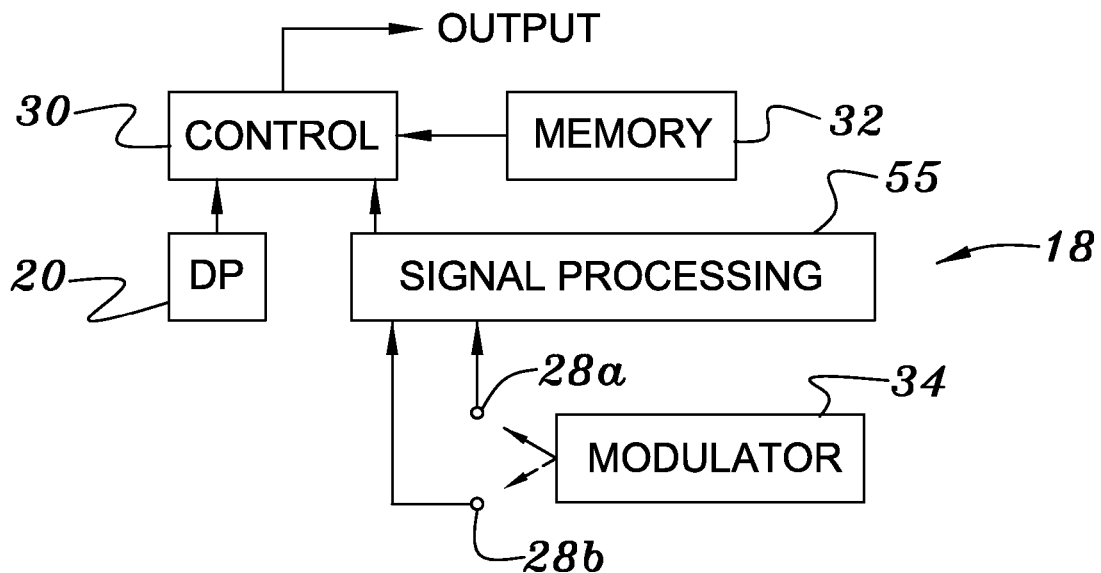
FIG. 2 is a schematic block diagram depicting electronic signal processing and control functions associated with the apparatus of FIGS. 1A and 1B.

In FIG. 1B, one finds a schematic depiction of an exemplar measurement apparatus of the invention for measuring flow through a pipe or other primary conduit 12. This apparatus comprises both a differential pressure sensor 20 connected upstream and downstream of a separate flow restriction 22 (which may be an orifice plate) by sensing tubes, and a thermal flow sensor 18 disposed in a bypass conduit 16 extending from one of the differential pressure transducer's sensing surfaces to the other.

As will become clear from the ensuing disclosure, the various arrangements of valves 24 depicted in FIGS. 1A and 1B provide for operation of both flow sensors and for the isolation of the thermal flow sensor 18 from the primary flow conduit when the thermal flow sensor is to be calibrated. The skilled reader will recognize that more or fewer valves, or valves located at other positions, may be used for an equivalent result.

In preferred embodiments, the bypass conduit 16 contains a small orifice 26 or other restriction which may optionally be made adjustable with a valve, such as a needle valve. Fluid flow through the thermal flow sensor 18 is inhibited by the relatively small size of the orifice 26 so that the rate of increase of flow in the bypass conduit 16 diminishes with increasing pressure differential across the restriction 22 in the primary conduit 12. This arrangement compensates for the increasing pressure differential of the fluid through the pipe as the flow rate in the primary conduit increases.

Although FIG. 1B schematically depicts an orifice plate 22 restricting flow in the primary conduit, the reader will appreciate that many other structures, which include, without limit, an adjustable post or wedge, may be used. Moreover, one could use a venturi structure as the flow restriction, in which case one of the two sensing tubes could be connected upstream of the venturi and the other at the position where the conduit diameter was a minimum.

The arrangements depicted in FIGS. 1A and 1B allow for outputs to be independently generated by a first sensor 14 (which may be an in-line sensor or a differential pressure sensor) and by a thermal flow sensor 18 that preferably uses two heated sensing elements 28a, 28b exposed to a modulated flow. These two outputs may be supplied to a controller 30, which may be a microcontroller operating according to instructions stored in a memory 32. The skilled reader will appreciate that many other arrangements may be provided for comparing and evaluating the outputs of the two sensors and that the controller is not constrained to be in the immediate proximity of the two sensors.

The fluid flow rate through the thermal flow sensor 18 is generally restricted by the orifice 26 to be low and to hence have only a small effect on the flow measurement made by a differential pressure sensor 20. However, in a preferred configuration a valve 24 is provided at a convenient place in the bypass conduit 16 so that flow through the bypass conduit can be completely shut off. This enables the first sensor to respond to the flow rate without any loss of accuracy. Alternately, if both the sensors are operated simultaneously, a stored difference in the readings of the first sensor with the valve opened and with the valve closed can be used as a correction factor.

The thermal flow sensor 18 may be used by itself to detect fluid flow rate. It may also be operated from the same pressure sensing ports of an operational differential pressure flow meter 20. Both meters can then provide an indication of the fluid flow rate at one location in the pipe. In addition, the thermal flow meter can use the output from a differential pressure, turbine or vortex sensor for calibration purposes in flow regimes in which the differential pressure produced therefrom is an accurate indicator of flow rate. Note that when mass flow in the primary conduit is to be measured rather than volume flow, the calibration also requires inputs from temperature and pressure sensors (not shown).

When both sensors are used simultaneously, an overall flow rate indication can be generated by using an output from the first 14 (e.g., differential pressure) sensor in a mid to upper flow rate range where that instrument is fairly accurate. The addition of the thermal flow sensor 18 allows for the apparatus to respond to lower flow rates and to have a zero flow rate calibration point. The useful flow rate range of the apparatus can then extend from very low flow rates to the maximum rate of the differential pressure sensor. The turndown is thereby increased from that characteristic of most sensors (e.g., about 10:1 for a differential pressure sensor) to several hundred to one, or more.

For the composite flow sensor of the invention 10 to have the desired improvement over other sensors, the thermal flow rate sensor 18 must have very low zero drift. In a preferred embodiment, a thermal mass flow rate sensor is used which senses the fluid flow rate as it is varied from a maximum to a minimum by a modulator 34, as taught in the inventor's U.S. Pat. No. 6,023,969. Although the modulator 34 can comprise a valve which is at one time opened to direct flow over a single heated element and at another time closed, a preferred embodiment alternately diverts a single input flow stream between two electrically heated elements 28a, 28b. This arrangement improves the speed of response of the sensor and does not shut off the flow through the modulator.

As taught in the inventor's U.S. Pat. No. 6,023,969, mass flow rate sensing elements and supporting electronics that are responsive only to the modulation component of the fluid flow are used for the rate measurement. At zero flow rate the modulation components of the fluid flow are also zero so that the sensing element output signal is zero, except for a small constant offset due to fluid movement caused by the modulator 34 itself. Because the thermal sensor only responds to the modulation components, its zero drift is resistant to the sensing surfaces being affected by environmental contaminants, and by electrical component drifts. The modulator 34 is therefore an important part in an exemplar metering system and this disclosure describes a modulator that is improved with respect to the one disclosed in U.S. Pat. No. 6,023,969.

It should be noted that the modulator 34 described herein is applicable to thermal flow sensors whether or not they operate with obstructions in the primary line producing differential pressures. For example, the modulator could be used with a thermal flow sensor having an inlet tube facing upstream and an outlet tube facing downstream to provide the fluid flow past the sensor. Furthermore, there is no inherent limit on the size of the inlet and outlet tubes which, in some cases, can be a small diameter bypass channel and in others can be the entire primary flow channel In some applications, notably for measuring steam flow, the sensing tubes and bypass conduit may experience ambient temperatures which will cause condensation that may interfere with the flow measurement. For these applications the tubes and bypass conduits may be intimately located with the pipe or may be separately electrically heated so that they are maintained at least at the temperature of the fluid in the primary conduit.

In some situations the fluid flowing in the primary conduit 12 may contain substances that can affect the operation of the thermal flow sensor 18 either by partially or completely obstructing the orifice 26 in the bypass conduit or by changing the characteristics of the sensor (e.g. by build-up of a contaminant film on an electrically heated sensing element). To deal with these situations one may provide an optional calibration loop 36 that may comprise a positive displacement calibrating pump 38 and that may be connected to the thermal flow sensor when it is isolated from the primary conduit by suitable valves 24.

FIGS. 3A, 3B and 5 depict a preferred embodiment of an improved modulator 34. In this device the flowing fluid enters a single input port 40, preferably centrally located, and is directed to either of the two output ports 42a, 42b that are preferably symmetrically disposed on opposite sides of the bypass conduit's flow axis. Each of the output ports 42a, 42b is respectively associated with a separate electrically heated temperature sensitive element 28a, 28b. The fluid output direction is preferably controlled by the angular position of a perforated rotor body 44 coaxially disposed within a perforated stator 46. The stator 46 and rotor 44 have slots 48 having the same axial and angular spacings so that the slots can be selectively aligned to allow flow or turned to block flow. These slots are angularly offset from each other by the amount of the rotor rotation, as shown in FIG. 5. Hence the fluid flow alternates between the ports corresponding to the two positions of he rotor. This provides that the flow past each of the electrically heated temperature sensitive elements 28a, 28b is modulated from a maximum value to a minimum, where the minimum need not be a complete shut-off.

Figure 4A:
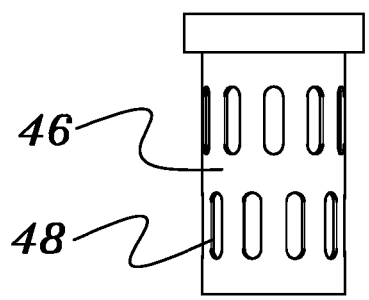
FIGS. 4A and 4B are, respectively, detail views of a perforate rotor and stator pair used in the flow modulator of FIGS. 3A and 3B.
Figure 4B:
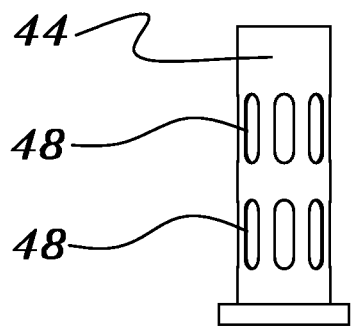

Although FIGS. 3A, 3B and 5 show a modulator in which the two output ports are in a facing relationship, the modulator can equally well be made using output ports stacked along the axis of the input flow. In this case the rotor and stator both have two rows of slots, one above the other and offset one half of the angular pitch between slots, as depicted in FIGS. 4A and 4B.

The modulator taught in U.S. Pat. No. 6,023,969 used an electric motor to rotate a rotor having two ports spaced apart by 180 degrees of arc. In the presently preferred embodiment only a relatively small angular change of a mechanical component is required to alternate the fluid flow between the ports. Hence, the movement of the fluid due to the modulation process is also relatively low and any compensation adjustment required for correcting the flow indication, for example at zero flow rate, is also correspondingly small.

If the slots 48 are located around its entire circumference, the rotor 44 may be rotated in one direction at a relatively low rate. The rotor may also be oscillated over the range of the angular distance between the slots, in which case the slots need only be located in the vicinity of the exit ports.

In a preferred embodiment an oscillatory drive is provided by an electromechanical actuator 50 such as that depicted in FIGS. 3A and 3B. A preferred actuator 50 device uses two pairs of permanent magnets arranged with opposed polarities attached adjacent respective ends of an armature 54. The use of dual pole pieces provides balance to the magnetic structure and the air gaps are minimized for improved efficiency. It may also be noted that this arrangement provides low power consumption in that widely spaced drive pulses to the coil 56 can move the armature 54 from one extreme position to the other and the armature can be held in a selected extreme position by a respective permanent magnet 52a, 52b.

It may be noted that various electromagnetic actuators may provide the desired oscillatory motion. For example, a magnetic drive using a single magnet can additionally use the pole pieces as mechanical stops. These permanent magnet oscillatory drives are relatively simple and cost effective. However, other types of valve actuators which also act directly on the rotor such as stepper motors, torque and conventional motors may also be used.

The modulator may also use optical (photoelectric) or magnetic (hall effect sensor) means sensitive to the position of the rotor or any part attached to it (armature) with an electronic controller to control the rotor movement so that it is precisely positioned at each end of its travel.

Figure 6:
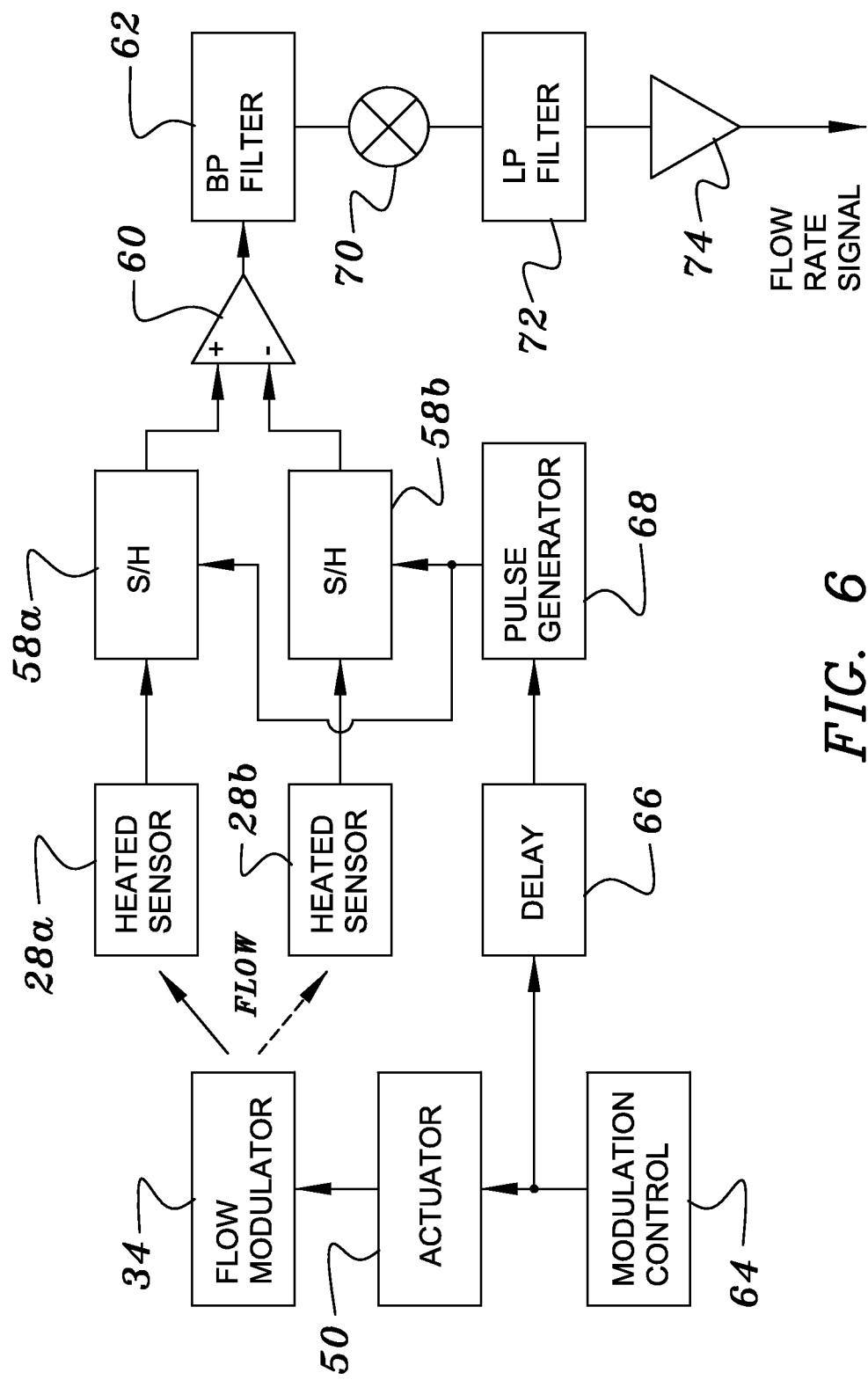
FIG. 6 is a schematic diagram of a circuit used to minimize the zero offset of a thermal flow sensor of the invention.

Regardless of how the modulator is driven, the motion of the modulating element can generate a parasitic flow signal that appears as a zero offset. This may be minimized by oscillating, rather than rotating, the rotor and by detecting the output signal from each heated element 28a, 28b just prior to the armature 54 repositioning. At these times the effects of the fluid movement by the armature 54 are minimal. Preferred thermal signal processing circuitry 55 uses sample and hold circuits 58a, 58b which provide signals to a differential amplifier 60, band pass filter 62 etc., as depicted in FIG. 6. Note that the modulation frequency is on the order of a few Hertz, which is compatible with the operating speed of the selected sample and hold circuitry.

In the preferred embodiment the flow modulator 34 is an electromagnetically actuated mechanical valve which diverts the fluid flow alternately between two heated sensors 28a, 28b which provide output signals having magnitudes responsive to the magnitude of the fluid flow. A modulation controller 64 supplies the electrical power to the actuator 50 and also through a delay 66, to a pulse generator 68 which activates the sample and hold circuits 58a, 58b. The delay time is set so that the sample and hold circuits 58a, 58b are activated during an oscillation dwell interval just before the flow is diverted from one sensor to the other. The outputs from the heated sensors are then retained and enter a differential amplifier 60 to extract the difference in the magnitude of their signals. These signals are band pass filtered to remove any DC drift components and higher frequency noise components. The filtered signal is supplied to a magnitude (amplitude) detector 70, the output of which is supplied to a low pass filter 72 providing the input to the output amplifier 74 which provides the flow responsive signal from the thermal signal processing circuitry 55.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A thermal flow sensor for measuring flow of a fluid, the sensor comprising:
    a cyclic flow modulator comprising: a common flow channel portion and a bifurcated flow channel portion; an electromechanical actuator; a perforate rotor turnable about an axis by the electromechanical actuator; and a perforate stator co-axial with the rotor, wherein the perforations in the rotor and stator cooperate to provide a minimum flow impedance between the common flow channel portion and one of the two bifurcated flow channel portions when providing a maximum flow impedance between the common flow channel portion and the other of the bifurcated flow channel portions, each minimum flow impedance state characterized by a plurality of respective perforations in the rotor being aligned with a corresponding plurality of respective perforations in the stator;
    two electrically heated temperature sensitive elements respectively disposed to receive fluid flowing through respective bifurcated channel portions, whereby the two temperature sensitive elements generate respective cyclic signals indicative of respective amounts of heat removed therefrom by the flowing fluid; and
    thermal flow signal processing circuitry operable to receive the cyclic signals and to determine therefrom the rate of flow.

2. The thermal flow sensor of claim 1 wherein the electromechanical actuator is operable to turn the rotor through no more than 45 degrees of arc.

3. The thermal flow sensor of claim 1 wherein the thermal flow signal processing circuitry is operable to receive the respective cyclic signal from each heated sensor at a time selected so that the effects of fluid movement are minimal.

4. The thermal flow sensor of claim 1 wherein the thermal flow signal processing circuitry comprises sample and hold circuitry.

* * * * *